United States Patent Office 3,582,471
Patented June 1, 1971

3,582,471
METHOD OF PRODUCING THREONINE BY FERMENTATION
Isamu Shiio, Kamakura-shi, and Shigeru Nakamori and Kounosuke Sano, Kawasaki-shi, Japan, assignors to Ajinomoto Co., Inc., Tokyo, Japan
No Drawing. Filed June 26, 1968, Ser. No. 740,026
Claims priority, application Japan, July 3, 1967, 42/42,733
Int. Cl. C12b 1/00
U.S. Cl. 195—30
3 Claims

ABSTRACT OF THE DISCLOSURE

Producing L-threonine with strains of *Brevibacterium flavum* and *Corynebacterium acetoacidophilum* which are resistant to α-amino-β-hydroxyvaleric acid in a conventional culture medium substantially free of L-homoserine.

---

This invention relates to a method of producing threonine, and more particularly to a method of producing threonine by fermentation.

An object of the present invention is to produce threonine at a low cost from readily available raw materials. L-threonine is one of the essential amino acids for animal nutrition. L-threonine has been used in medical researches, as an intermediate in the production of other compounds valuable to biochemists and as a food additive.

If, it has been reported in U.S. Patent No. 3,009,604 that some specific microorganisms can produce L-threonine in a medium containing L-homoserine as a substrate. However the cost of L-homoserine, employed as a main raw material, is higher than that of other carbon sources such as sugars. It has been also known already that some mutant strains of *Escherichia coli* which require diaminopimelic acid and methionine for their growth and some mutant strains of *Micrococcus glutamicus* which require methionine and lysine for their growth can produce L-threonine in a medium by fermentation.

We now have found that some mutant strains of genus *Brevibacterium* and genus *Corynebacterium* which are resistant to α-amino-β-hydroxyvaleric acid have the ability to produce and accumulate remarkable amounts of L-threonine in culture medium practically free from L-homoserine.

The mutant strains employed in the present method, are characterized by their resistance to α-amino-β-hydroxyvaleric acid which is an analogue of threonine. The microorganisms may combine a nutrient-requirement and resistance to any other compound with the resistance to α-amino-β-hydroxyvaleric acid.

These resistant mutants may be obtained by screening from natural sources or by the conventional artificial mutant inducing method.

Representation microorganisms for the present method are *Brevibacterium flavum* B-2 (ATCC 21269) and *Brevibacterium flavum* B-107, both of which were obtained from *Brevibacterium flavum* No. 2247 by artificial mutation, and *Corynebacterium acetoacidophilum* C-502 (ATCC 21270) obtained from *Corynebacterium acetoacidophilum* No. 410 by artificial mutation.

Table 1 shows the influence of different concentrations of α-amino-β-hydroxyvaleric acid in the culture medium on the growth of *Brevibacterium flavum* B-107 as a representative of resistant strains and on its parent strain, *Brevibacterium flavum* No. 2247 as a representative of sensitive strains.

TABLE 1

| | Relative growth | |
|---|---|---|
| | Brevi. flavum B-107 | Brevi. flavum No. 2247 |
| Concentration of α-amino-β-hydroxyvaleric acid (mg./ml.): | | |
| 0 | 100 | 100 |
| 0.5 | 98 | 81 |
| 1 | 100 | 48 |
| 2 | 86 | 22 |
| 3 | 89 | 22 |
| 4 | 89 | 21 |
| 5 | 85 | 8 |

NOTE.—The fermentation was carried out at 30° C. by employing 3 ml. of the under-mentioned minimal medium containing α-amino-β-hydroxyvaleric acid in an amount mentioned in Table 1.

After 24 hours' fermentation, each growth was examined.

Minimal medium:
- glucose—5g./l.
- urea—1.5g./l.
- $(NH_4)_2SO_4$—1.5g./l.
- $K_2HPO_4$—3.0g./l.
- $KH_2PO_4$—1.0g./l.
- $MgSO_4$—0.1g./l.
- $CaCl_2$—0.001g./l.
- biotin—30μg./l.
- vitamin $B_1$—100μg./l.
- trace elements [1]—ml./l.
- pH 7.0

[1] Trace elements include:     mg./l.
- $Na_2B_4O_7 \cdot 10H_2O$ — 88
- $(NH_4)_6Mo_7O_{24} \cdot 4H_2O$ — 37
- $FeCl_3 \cdot 6H_2O$ — 970
- $ZnSO_4 \cdot 7H_2O$ — 8,800
- $CuSO_4 \cdot 5H_2O$ — 270
- $MnCl_2 \cdot 4H_2O$ — 72

As it is apparent from the results shown in Table 1, the growth of the known microorganism was significantly inhibited when α-amino-β-hydroxyvaleric acid was added to a medium in an amount of more than 0.5 mg./ml., but the growth of the mutant was not reduced by the addition of the same amount of α-amino-β-hydroxyvaleric acid.

When the growth of a microorganism cultured in a medium containing 1 mg./lm. of α-amino-β-hydroxyvaleric acid for 24 hours is more than 70% of its growth in a medium which does not contain α-amino-β-hydroxyvaleric acid, we consider the microorganism resistant to α-amino-β-hydroxyvaleric acid.

Therefore, we can obtain microorganisms for the present method by culturic a mutant of *Brevibacterium flavum* or *Corynebacterium acetoacidophilum* on a test culture medium containing 1 mg./ml. of α-amino-β-hydroxyvaleric acid, isolating a strain capable of vigorous growth on said test medium, and testing the strain of its ability of producing L-threonine.

α-Amino-β-hydroxyvaleric acid employed in the present invention is prepared as follows; n-propionaldehyde and the copper complex of glycine are reacted in the presence of an alkaline material, and the copper is removed from the reaction. α-Amino-β-hydroxyvaleric acid is recovered as a substance which is hardly soluble in absolute ethanol and shows higher $R_f$ value by paperchromatography in a solvent system of methylethylketone-n butanol-water-concentrated ammonia (3:5:1:1).

The culture medium employed for producing L-threonine in our method may be entirely conventional. It must contain an assimilable carbon source, an assimilable nitrogen source, and the usual minor nutrients. The carbon sources suitable for use in the present invention are glucose, maltose, fructose, starch hydrolyzate, and molasses. Oroganic acids such as acetic acid and citric acid, alcohols and hydrocarbons are also employed as carbon sources. A nitrogen source may be provided by ammonium salts of inorganic acids such as amomnium sulfate and ammonium chloride, or by ammonia in an aqueous solution or in gaseous state. Organic compounds, such as amino acids, urea, or protein hydrolyzate may also be used as nitrogen sources. The inorganic nutrients may include a phosphate, a salt of calcium, a salt of magnesium, a salt of iron, a salt of manganese and so on as is conventional.

Growth promoting agents and other nutrients which improve the yield and the rate of production of L-threonine include amino acids, various vitamins, soya bean protein hydrolysate, yeast extract, corn steep liquor, peptone, casein hydrolyzate and so on.

The fermentation is carried out between 20° and 40° C. for about 24 to 72 hours under aerobic conditions with shaking or aeration and agitation, controlling the pH value of the medium between 5 and 9. When the pH of the medium tends to fall below 5.0, it is preferable to adjust it by using neutralising agents such as calcuim carbonate and aqueous ammonia. On the contrary, when organic acids were employed as carbon sources, the pH of the medium tends to rise, and it is preferable to adjust it within said range by using the organic acids or a neutralising agent such as hydrogen chloride or sulphuric acid.

The recovery of L-threonine from the cultured broth may follow known methods. The bacterial cells may be removed by filtration or by centrifuging, and L-threonine may be recovered by means of cation-exchange resin of H type, partial evaporation of the eluate under reduced pressure and precipitation of the product from the concentrate.

The L-threonine accumulated in the broth is estimated by microbioassay employing *Streptococcus faecalis* (ATCC 8043). The product of the present invention was identified as L-threonine by its mobility in electrophoresis, its biological activity in microbioassay and its Rf value in paper chromatography.

The following examples are further illustrative of the invention, but it will be appreciated that the invention is not limited thereto.

EXAMPLE 1

A culture medium was prepared to the following composition:

Carbon source (cf. Table 2)—10%
Ammonium sulphate—4%
Potassium dihydrogen phosphate—0.3%
Magnesium sulphate—0.04%
Biotin 300 µg./l.
Vitamin $B_1$—200 µg./1.
$Fe^{++}$—2 p.p.m.
$Mn^{++}$—2 p.p.m.
Soy bean protein hydrolysate (total nitrogen 2.2 g./dl.— 0.2 ml./dl.
Calcium carbonate (sterilised separately)—5%

20 milliliter batches of the above-mentioned medium were placed in 500 ml. shaking flasks, and sterilized by steam in the flasks at 110° C. for 5 minutes. *Brevibacterium flavum* B-2 was inoculated into these fermentation media and cultivated under aerobic conditions at 30° C. for 48 hours. The amount of L-threonine accumulated in each cultured broth was as shown in Table 2.

TABLE 2

| Carbon source | Concentration (percent) | L-threonine accumulated (g./l.) |
|---|---|---|
| Glucose | 10 | 6.4 |
| Maltose | 10 | 5.5 |
| Sucrose | 10 | 4.4 |
| Fructose | 10 | 3.8 |
| Cane molasses (as glucose) | 10 | 2.7 |

The (microbial) cells were separated from the first mentioned fermented broth containing 6.4 g./l. of L-threonine by centrifugation and the supernatant was passed over a column of cation exchange resin (H type) after removal of ammonia and carbonic acid. 4.6 grams pure L-threonine in crystalline form were obtained from one liter of said broth.

EXAMPLE 2

Fermentations were carried out by employing microorganisms listed in Table 3 under the same conditions as in Example 1. The medium employed was the same as mentioned in Example 1 whose carbon source was 10% of glucose.

*Brevibacterium flavum* No. 2247 was employed as an example of a microorganism which is sensitive to α-amino-β-hydroxyvaleric acid.

TABLE 3

| Microorganisms employed | Resistant to analogue | Nutrient requirement | L-threonine accumulated (g./l.) |
|---|---|---|---|
| Brevi. flavum B-103 | + | — | 2.8 |
| Brevi. flavum B-105 | + | — | 3.3 |
| Brevi. flavum B-107 | + | — | 2.8 |
| Brevi. flavum B-10 | + | Ileu.⁻, Lys.⁻ | 3.7 |
| Brevi. flavum No. 2247 | — | — | 0.04 |

NOTE.—Resistant to analogue, + = resistant to α-amino-β-hydroxyvaleric acid; Resistant to analogue, − = sensitive to α-amino-β-hydroxyvaleric acid; Ileu.⁻, Lys⁻ =requires isoleucine and lysine for its growth; Nutrient requirement − = does not require any nutrient for its growth.

EXAMPLE 3

A culture medium was prepared to the following composition:

Glucose—10%
Ammonium sulphate—3%
Potassium dihydrogen phosphate—0.15%
Magnesium sulphate—0.04%
Biotin—200 µg./l.
Vitamin $B_1$—300 µg./l.
$Fe^{++}$—2 p.p.m.
$Mn^{++}$—2 p.p.m.
Soy bean protein hydrolysate (total nitrogen 2.2 g./dl.)— 4 ml./l.
Calcium carbonate (sterilised separately)—5%

20 milliliter batches of the above-mentioned medium were placed in 500 ml. shaking flasks, and sterilized by steam at 110° C. for 5 minutes. The medium was inoculated with *Corynebacterium acetoacidophilum* C–502 and the fermentation was carried out under aerobic conditions at 30° C. for 64 hours. The amount of L-threonine accumulated in the fermented broth was 3.6 g./l.

What we claim is:

1. A method of producing L-threonine which comprises culturing a threonine-producing strain of *Brevibacterium flavum* or *Corynebacterium acetoacidophilum* which is resistant to α-amino-β-hydroxyvaleric acid under aerobic conditions in a medium substantially free of L-homoserine and containing assimilable sources of carbon and nitrogen, inorganic substances and organic growth promoting substances, while maintaining the pH value of the medium within the range of 5 to 9, until L-threonine is produced in said medium, and recovering said L-threonine from said medium.

2. A method as set forth in claim 1, wherein said assimilable carbon source is selected from the group consisting of carbohydrates and organic acids and said assimilable nitrogen is selected from the group consisting of ammonia, ammonium salts and urea.

3. A method as set forth in claim 1, wherein said threonine-producing strain is *Brevibacterium flavum* B–2 (ATCC 21269) or *Corynebacterium acetoacidophilum* C–502 (ATCC 21270).

References Cited
UNITED STATES PATENTS 3,099,604   7/1963   Kinoshita et al. _____ 195—47

A. LOUIS MONACELL, Primary Examiner

G. M. NATH, Assistant Examiner

U.S. Cl. X.R.

195—28, 47